US006962229B2

(12) United States Patent
Miyahara (10) Patent No.: US 6,962,229 B2
(45) Date of Patent: Nov. 8, 2005

(54) ENGINE MOUNT STRUCTURE FOR VEHICLE (75) Inventor: Tetsuya Miyahara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 29 days.

(21) Appl. No.: 10/501,114

(22) PCT Filed: Aug. 26, 2003

(86) PCT No.: PCT/JP03/10755

§ 371 (c)(1),
(2), (4) Date: Jul. 12, 2004

(87) PCT Pub. No.: WO2004/022372

PCT Pub. Date: Mar. 18, 2004

(65) Prior Publication Data
US 2005/0121250 A1 Jun. 9, 2005

(30) Foreign Application Priority Data

Sep. 6, 2002 (JP) .............................. 2002-261997

(51) Int. Cl.$^7$ .............................................. B60K 1/00
(52) U.S. Cl. .................. 180/291; 180/312; 267/140.13
(58) Field of Search ............................... 180/291, 299, 180/295, 297, 300, 312, 311; 267/140.13, 267/140.11, 140.12, 140.1, 141.3; 248/635, 248/634, 636, 638, 637

(56) References Cited

U.S. PATENT DOCUMENTS

| 3,350,042 | A | * | 10/1967 | Stewart et al. ............ 267/141.4 |
| 3,756,551 | A | * | 9/1973 | Bishop ..................... 267/141.1 |
| 3,895,408 | A | * | 7/1975 | Leingang .................... 267/153 |
| 4,157,227 | A | * | 6/1979 | Hahle ....................... 267/141.1 |
| 4,521,004 | A | * | 6/1985 | Caldwell ................... 267/141.4 |
| 4,522,378 | A | * | 6/1985 | Nelson ..................... 267/141.4 |
| 4,667,764 | A | * | 5/1987 | Sawada et al. ............. 180/312 |
| 5,074,374 | A | * | 12/1991 | Ohtake et al. ............. 180/312 |
| 5,129,479 | A | * | 7/1992 | Fujii et al. ................ 267/141.2 |
| 5,651,535 | A | * | 7/1997 | David ...................... 267/140.5 |
| 5,842,677 | A | * | 12/1998 | Sweeney et al. ............ 248/634 |
| 6,382,605 | B1 | * | 5/2002 | Kato ........................ 267/141.2 |
| 6,394,434 | B2 | * | 5/2002 | Wolf et al. ................. 267/141 |

FOREIGN PATENT DOCUMENTS

| EP | 1 260 427 A2 | 11/2002 |
| GB | 2 329 877 A | 4/1999 |
| JP | 06-173988 | 6/1994 |
| JP | 08135718 | 5/1996 |
| JP | 2002127762 | 5/2002 |

* cited by examiner

*Primary Examiner*—Hau Phan
(74) *Attorney, Agent, or Firm*—Rankin, Hill, Porter & Clark LLP (57) ABSTRACT

An engine mount mounts a motive power source to a vehicle body. The engine mount includes an inner cylindrical member attached to the motive power source, and a resinous bracket attached to the vehicle body. The inner cylindrical member is elastically connected to the bracket. The bracket includes a cold shut portion and a weak portion provided at the cold shut portion. The cold shut portion is formed when the bracket is molded from molten resin. The weak portion has such a small strength that, when the vehicle body collides with some object, the bracket is fractured to absorb the collision.

3 Claims, 6 Drawing Sheets

ENGINE MOUNT STRUCTURE FOR VEHICLE

BACKGROUND OF THE INVENTION

1. Technical Field

The present invention relates to a vehicular engine mount designed to have a fracture strength set such that the engine mount is fractured during collision of a vehicle.

2. Description of Related Art

Known engine mounts are structured to have resinous members mounted to bodies of vehicles. One example of such engine mounts is disclosed in Japanese Patent Laid-Open Publication No. HEI 6-173988.

Figure 6:
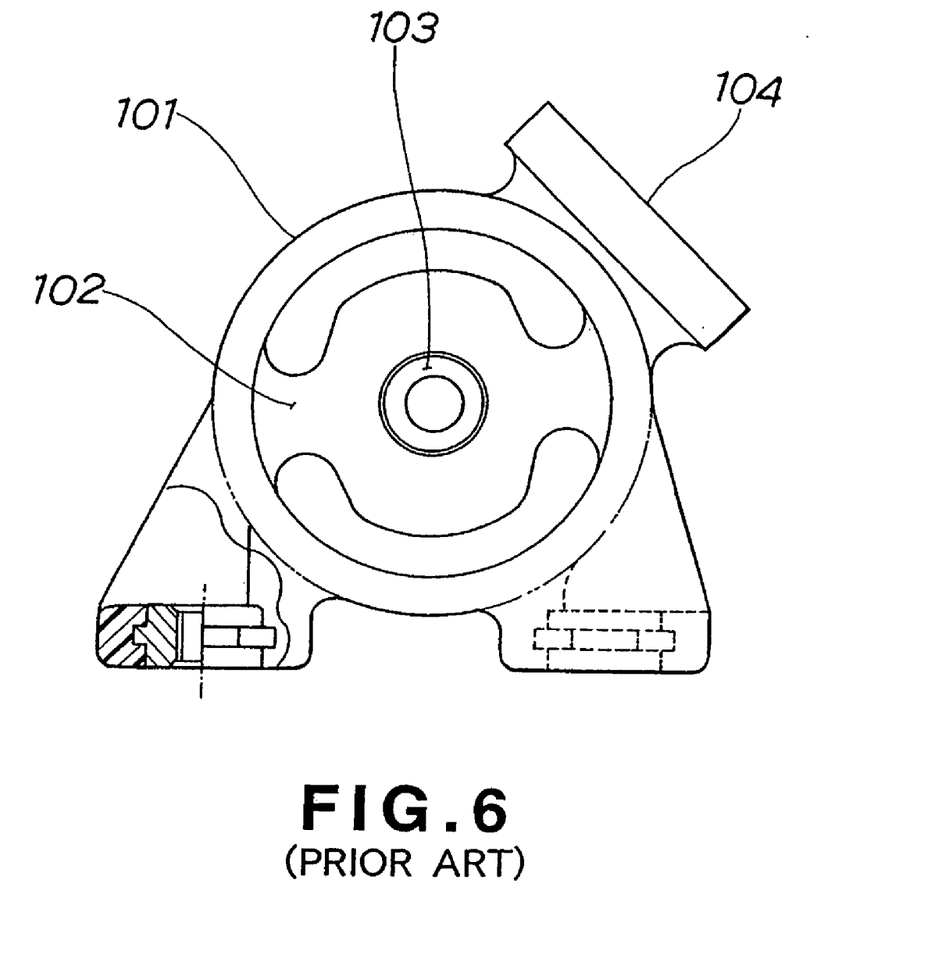
FIG. 6 illustrates partly in cross-section a conventional engine mount.

FIG. 6 hereof shows an anti-vibration member disclosed in the publication. The anti-vibration member includes a plastic bracket portion 101 mounted to a vehicle body, a rubber 102 connected to the bracket portion 101, and an inner cylindrical member 103 connected to the rubber 102 and mounted to an engine. The anti-vibration member also includes an inertial member 104.

Vehicles should have not only their front parts of sufficient rigidity but also engines, deemed to be a rigid body, displaceable by a controlled distance during head-on collision or offset collision of the vehicles for the purpose of protecting passengers within the vehicles.

During the collision, the front part of the vehicle is subjected to a great force. If the engine is then easily movable rearwardly, it is possible to absorb the collision.

The vehicle has the engine mounted to a vehicle body thereof through engine mounts. The engine mount is required to fracture or operate in a stroke sufficient to displace the engine by a greater distance during collision of the vehicle.

However, the anti-vibration member disclosed in the publication is not arranged to break or operate in a stroke necessary to displace the engine by the greater distance. Moreover, the anti-vibration member does not have its fracture strength set allowing for the displacement of the engine during the collision of the vehicle.

BRIEF SUMMARY OF THE INVENTION

An object of the present invention is to provide a vehicular engine mount improved to provide a fracture strength set such that the engine mount is broken by undergoing a force developed during collision of a vehicle.

According to a first aspect of the present invention, there is provided an engine mount for mounting to a vehicle body a motive power source including an engine and a transmission, comprising: an inner cylindrical member to be mounted to one of the motive power source and the vehicle body; an outer mounting member to be mounted to the other of the motive power source and the vehicle body, the outer mounting member being elastically connected to the inner cylindrical member; and the outer mounting member having a cylindrical portion loosely receiving the inner cylindrical member therein such that the inner cylindrical member is movable in both axial and radial directions thereof relative to the cylindrical portion, the outer mounting member having a weak portion for fracturing the outer mounting member to displace the motive power source rearwardly of the vehicle body during collision of the vehicle body, the weak portion being provided at a cold shut portion, formed when the outer mounting member is molded from molten resin, of the outer mounting member.

In a preferred form of the present invention, the molding of the outer mounting member is performed through the use of a mold having a cavity formed therein and a columnar part disposed within the cavity to provide the cylindrical portion during the molding of the outer mounting member, the columnar part being capable of dividing the molten resin into two parts during the molding of the outer mounting member, such that the two parts of the molten resin flow within the cavity to surround the columnar part and join together to provide the cold shut portion.

According to a second aspect of the present invention, there is provided an engine mount for mounting to a vehicle body a motive power source including an engine and a transmission, comprising: an inner cylindrical member to be mounted to one of the motive power source and the vehicle body; a resinous outer mounting member to be mounted to the other of the motive power source and the vehicle body; an elastic member connecting the inner cylindrical member to the outer mounting member; the outer mounting member having a cylindrical portion surrounding the inner cylindrical member with a predetermined interval provided therebetween; and the outer mounting member having a cold shut portion and a weak portion provided at the cold shut portion, the cold shut portion being formed when the outer mounting member is molded from molten resin through the use of a mold having a cavity formed therein and a columnar part disposed within the cavity to provide the cylindrical portion during the molding of the outer mounting member, the columnar part being capable of dividing the molten resin into two parts during the molding of the outer mounting member, such that the two parts of the molten resin flow within the cavity to surround the columnar part and join together to provide the cold shut portion.

The weak portion is sized and arranged to cooperate with the cold shut portion of small strength so as to provide the engine mount with fracture strength set such that: (1) when the vehicle is in such normal operation as acceleration, deceleration, skidding and traveling on a rough terrain, to thereby vibrate the motive power source, the engine mount absorbs the vibration transmitted to the motive power source without the resinous bracket being broken; and (2) when the vehicle collides with some object to thereby exert a force on the motive power source, the engine mount absorbs the collision by breaking the resinous bracket.

BRIEF DESCRIPTION OF DRAWINGS

A certain preferred embodiment of the present invention will herein-after be described in detail, by way of example only, with reference to the accompanying drawings, in which.

DETAILED DESCRIPTION OF THE INVENTION

Figure 1:
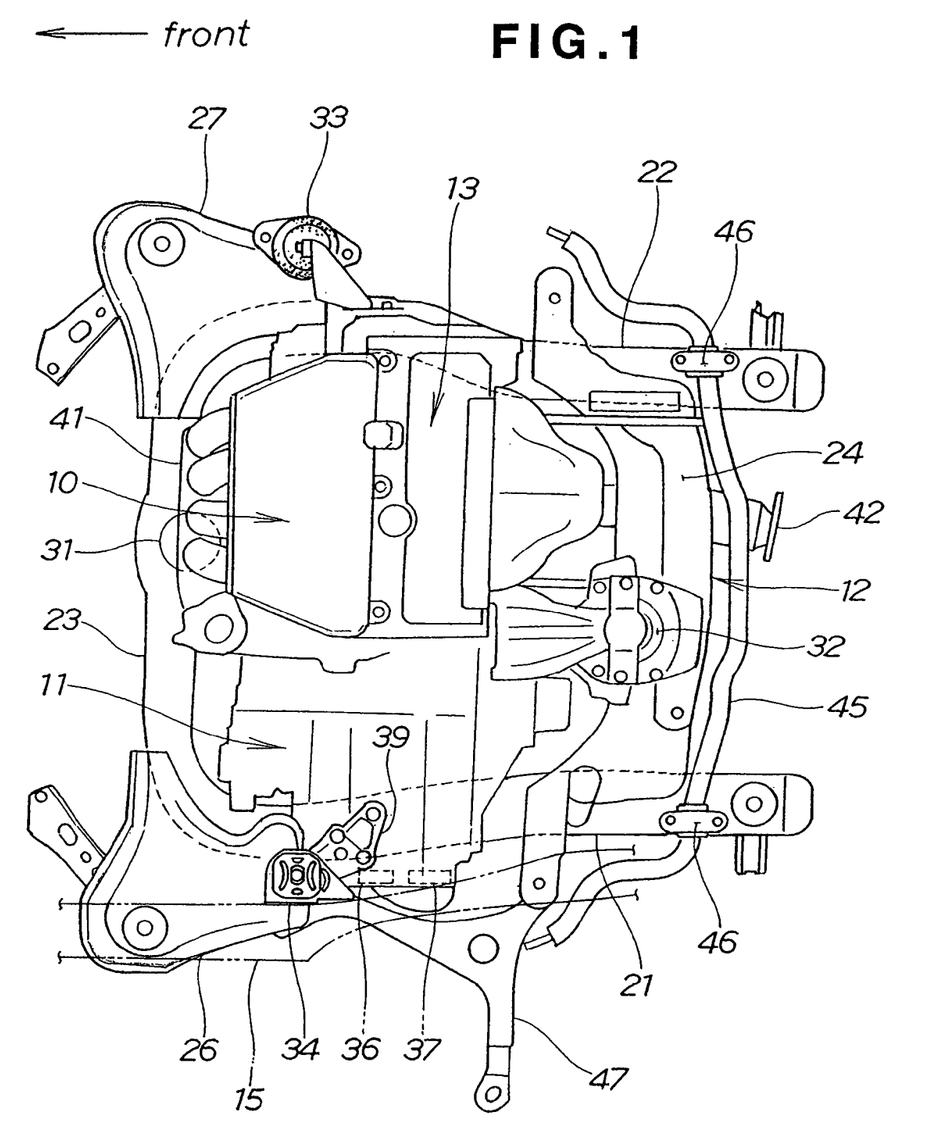
FIG. 1 is a top plan view of an engine compartment of a vehicle having an engine mount of the present invention disposed therein.

Referring to FIG. 1, there are shown vehicular components disposed within an engine compartment of a vehicle. It is to be noted that an arrow labeled "front" points in a forward direction of the vehicle.

The vehicular components include an engine 10, a transmission 11 connected to one side of the engine 10, a subframe 12 and right and left front side frames (only left one shown and designated at 15). The subframe 12 and the front side frames support the engine 10 and the transmission 11. The engine 10 and the transmission 11 cooperate with each other to constitute a motive power source 13.

The subframe 12 is an assembly mounted to the right and left front side frames. The subframe 12 includes right and left subframe portions 22, 21 and front and rear beams 23, 24. The subframe portions 22, 21 extend in a front-and-rear direction of the vehicle. The front beam 23 extends between front parts of the subframe portions 22, 21 while the rear beam 24 extends between rear parts of the subframe portions 22, 21. At a portion where the right subframe portion 22 is joined to the front beam 23, there is mounted a right plate 27. At a portion where the left subframe portion 21 is joined to the front beam 23, there is mounted a left plate 26.

The engine 10 and the transmission 11 are supported by front and rear mounts 31, 32, an engine side mount 33, a transmission upper mount 34 and transmission lower mounts 36, 37. The front mount 31 is positioned at a substantially central portion of a front part of the motive power source 13 or engine 10. The rear mount 32 is positioned between and behind rear parts of the engine 10 and the transmission 11. The engine side mount 33 is positioned on the other side of the engine 10 positioned opposite the one side joined to the transmission 11. The transmission upper mount 34 is positioned on one side of the transmission 11. More specifically, the transmission upper mount 34 is disposed on a side edge of the transmission 11. The transmission lower mounts 36, 37 are positioned beneath the one side of the transmission 11.

Such a transmission upper mount 34 is an engine mount of the present invention. The transmission upper mount 34 is attached to the transmission 11 through a mount bracket 39. The transmission upper mount 34 is attached directly to the left front side frame 15 provided on a vehicle body of the vehicle. The term "engine mount" as used herein means a member for elastically holding or mounting the motive power source 13 to the vehicle body.

The engine 10 includes an intake manifold 41, and an exhaust manifold having an exhaust pipe 42 mounted thereto. The right and left subframe portions 22, 21 have a stabilizer 45 extending transversely thereof. The stabilizer 45 is mounted to the rear parts of the subframe portions 22, 21 by means of brackets 46, 46. Reference numeral 47 denotes a suspension arm.

Figure 2:
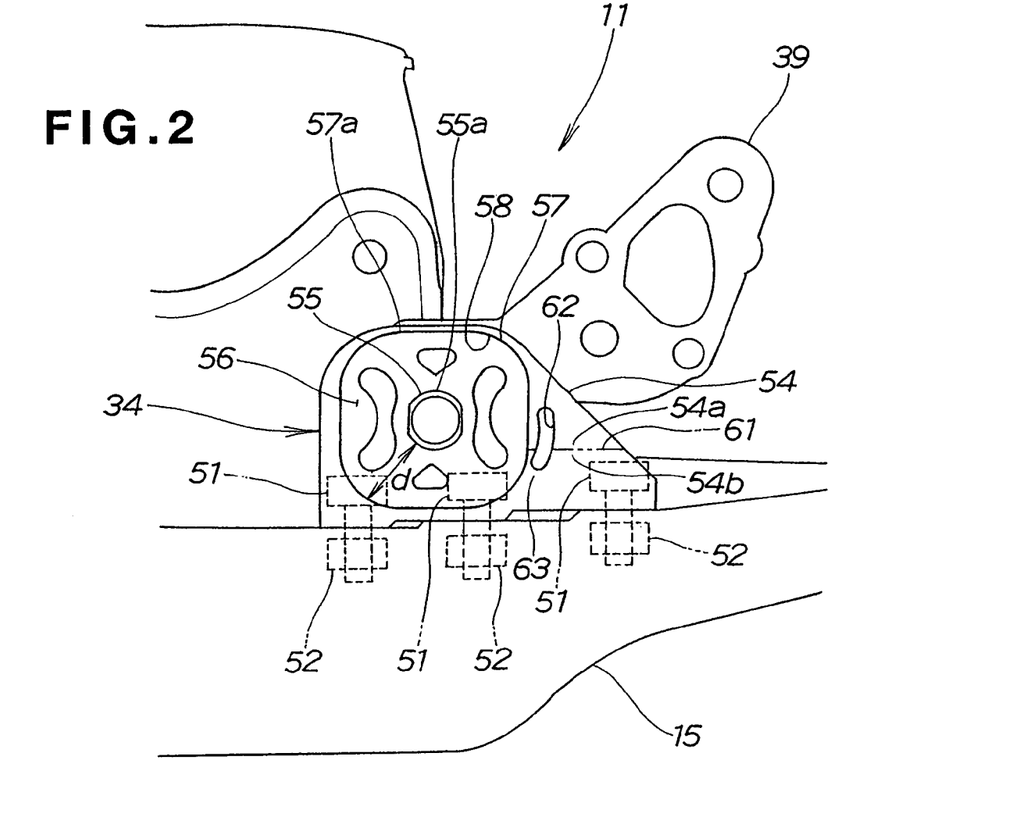
FIG. 2 is a top plan view of the engine mount mounted at its side wall to a left front side frame of the vehicle.

As shown in FIG. 2, the front side frame 15 has nuts 52, 52, 52 welded thereto. The transmission upper mount 34 is attached to an inner surface of the front side frame 15 with bolts 51 threadedly engaged with the nuts.

The transmission upper mount 34 includes a resinous bracket 54 mounted to the front side frame 15, a metal inner cylindrical member 55 mounted to the mount bracket 39 mounted to the transmission 11, and an elastic member 56 connecting the resinous bracket 54 to the inner cylindrical member 55. The elastic member 56 is a rubber, for example. In other words, the resinous bracket 54 is elastically connected to the inner cylindrical member 55.

The resinous bracket 54 includes a tubular or cylindrical portion 57. The cylindrical portion 57 has its inner peripheral surface 57a defining an opening or space 58 of cylindrical configuration. The cylindrical portion 57 surrounds the inner cylindrical member 55. The inner cylindrical member 55 has its outer peripheral surface 55a spaced from the inner peripheral surface 57a by a predetermined interval or distance d. In other words, the inner cylindrical member 55 is loosely received in the cylindrical portion 57. With this arrangement, the inner cylindrical member 55 is movable radially and axially thereof relative to the cylindrical portion 57. More specifically, the inner cylindrical member 55 and the elastic member 56 are positioned in the space 58. The bracket 54 has a cold shut portion 61 formed when the bracket 54 is molded out of molten resin, as will be described later. The bracket 54 includes a weak or fragile portion 63 having a hole 62 formed to extend vertically through the cold shut portion 61. The hole 62 extends horizontally in the form of an arc. More specifically, as viewed in top plan, the hole 62 takes the form of an arc extending transversely of and substantially perpendicularly to the cold shut portion 61. The cold shut portion 61 is positioned or formed in parallel to a direction of exertion of force on the transmission upper mount 34 during collision of the vehicle with some object, as will be discussed later in relation to FIG. 5A and FIG. 5B. As will be described later with reference to FIG. 4A through FIG. 4D, during molding of the bracket 54, two flows or parts of melted resin come together to produce such a cold shut portion 61. The elastic member 56 is mounted within the space 58 in contact with the inner peripheral surface 57a of the cylindrical portion 57. The cold shut portion 61 is formed in texture of the resinous bracket 54. The cold shut portion 61 of the bracket 54 has its opposite sides 54a, 54b having smaller strength than the rest of the resinous bracket 54. In accordance with the present invention, the cold shut portion 61 is positively or advantageously used to facilitate breaking the bracket 54 when the vehicle body collides with some object. No one has found that such a cold shut portion 61 of small strength is formed for the purpose of breaking the bracket 54 during the collision of the vehicle.

The hole 62 is provided as follows.

The bracket 54 free from the hole 62 is molded from molten resin through the use of a mold 71 (See FIG. 4A to FIG. 4D). Thereafter, machining operation is performed on a part including the cold shut portion 61 to thereby provide the hole 62.

The hole 62 may have its various sizes or contours to provide further small strength of the cold shut portion 61. Namely, the further small strength of the cold shut portion 61 is achieved by providing the hole 62.

For example, the hole 62 is made large in size to thereby reduce the size or cross-sectional area of the cold shut portion 61. This reduction provides decreased fracture strength of the bracket 54.

Figure 3:
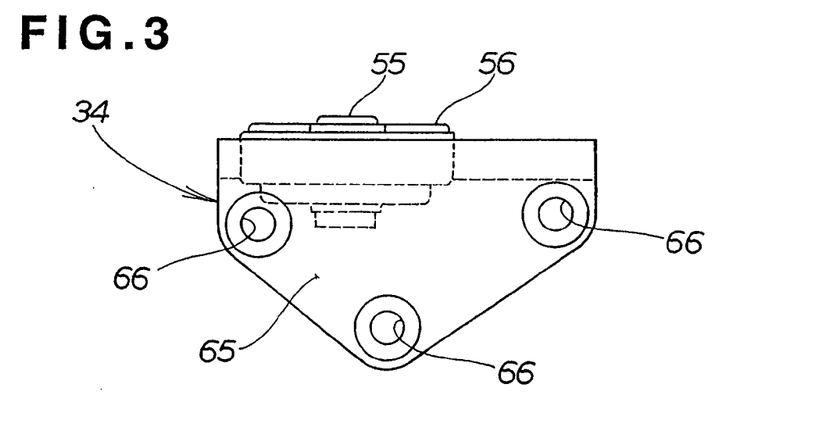
FIG. 3 is a side elevation view of the engine mount.

As shown in FIG. 3, the transmission upper mount 34 has a side wall 65 of generally pentagonal configuration. The side wall 65 has bolt apertures 66 formed to allow the bolts 51 to be inserted therethrough for attachment of the transmission upper mount 34 to the front side frame 15.

Discussion will be made as to how the bracket 54 is molded from molten resin.

Figure 4A:
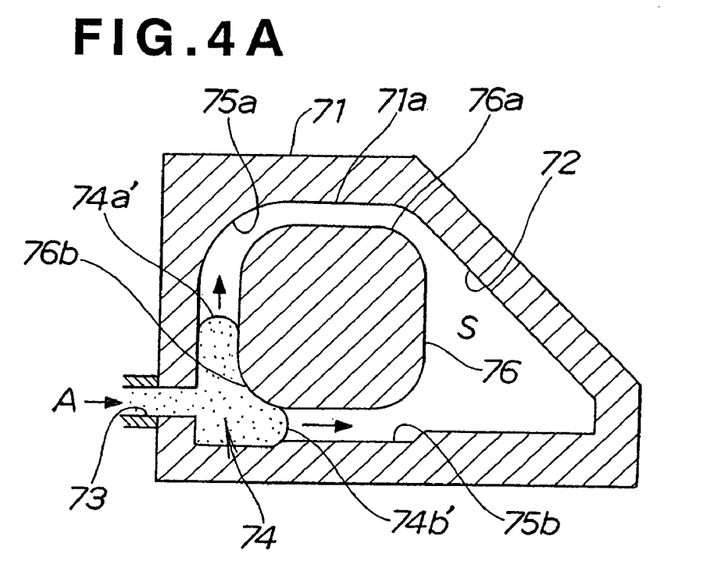
FIG. 4A through FIG. 4D illustrate how the engine mount is molded out of molten resin flowing within a cavity of a mold in accordance with the present invention.

As shown in FIG. 4A, molten resin 74 is injected through an injection port 73 into a cavity 72 of the mold 71, as indicated by arrow A. The mold 71 has a columnar part 76 disposed within the cavity 72. The cavity 72 has first and second passageways 75a, 75b each formed between an inner surface 71a of the mold 71 and an outer surface 76a of the columnar part 76. The cavity 72 also has a joining space S cooperating with the first and second passageways 75a, 75b to surround the columnar part 76. Each of the first and second passageways 75a, 75b communicates with the injection port 73 and the joining space S.

After passing through the injection port 73, the molten resin 74 hits a corner 76b of the columnar part 76 to divide into two flows or parts of the molten resin 74. One part of the molten resin 74 is referred to as "first resin 74a". The other is referred to as "second resin 74b". The first resin 74a has its leading end surface 74a' while the second resin 74b has its leading end surface 74b'.

Figure 4B:
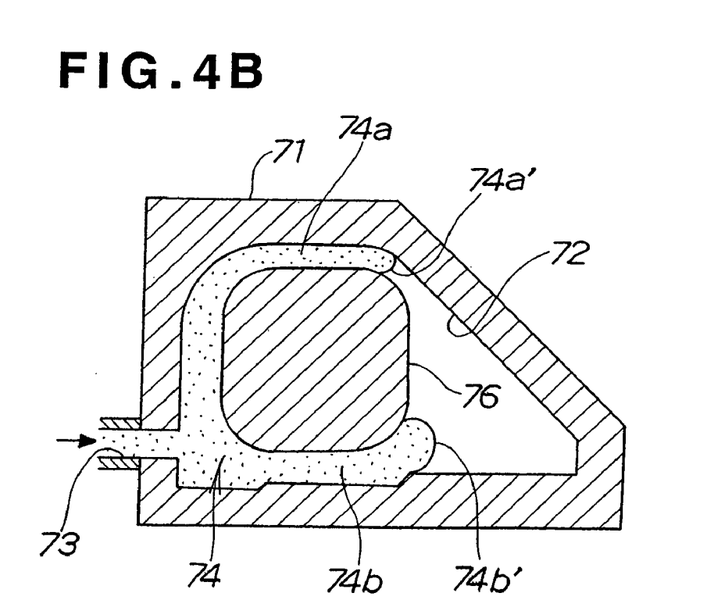

As shown in FIG. 4B, the first and second resins 74a, 74b flow through the first and second passageways 75a, 75b, respectively. At this time, one half of the cavity 72 is occupied by the molten resin 74.

Figure 4C:
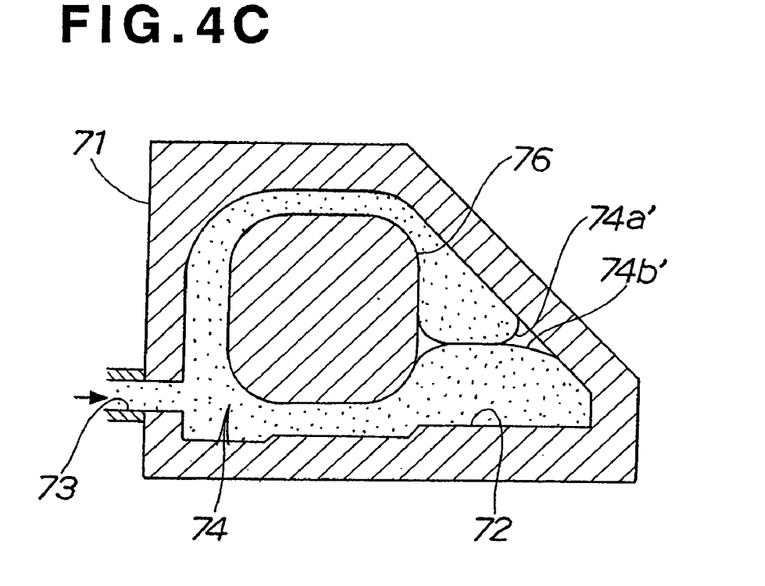

As shown in FIG. 4C, the first and second resins 74a, 74b flow into the joining space S. Then, the respective leading end surfaces 74a', 74b' of the first and second resins 74a, 74b partly come together or contact each other.

Figure 4D:
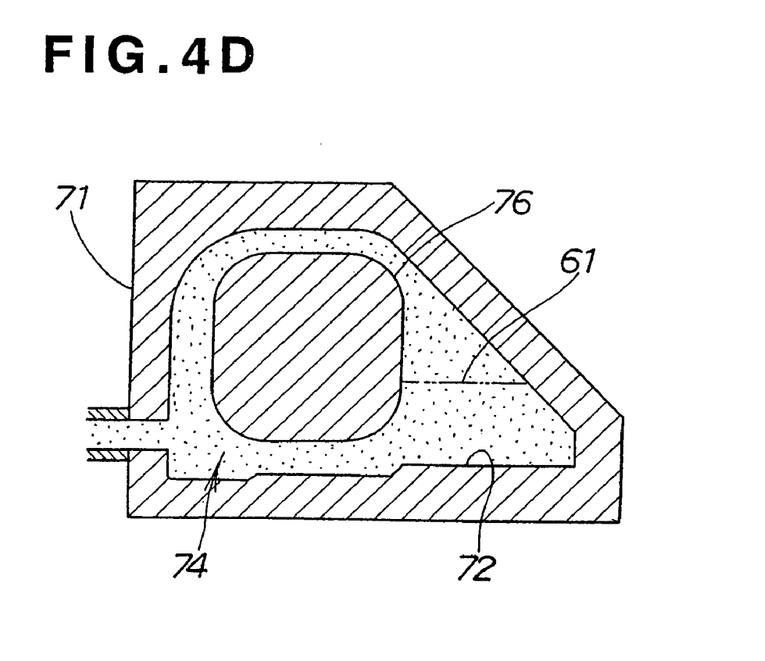

As shown in FIG. 4D, the cavity 72 is completely filled with the molten resin 74. The leading end surfaces. 74a', 74b' come together, or have their entire areas meeting each other to provide the cold shut portion 61 therebetween. With the leading end surfaces thus held in contact with each other, the molten resin 74 is hardened to thereby provide the cold shut 61 as indicated by a phantom line.

Discussion will be made as to how the transmission upper mount 34 is broken in relation to FIG. 5A and FIG. 5B.

Figure 5A:
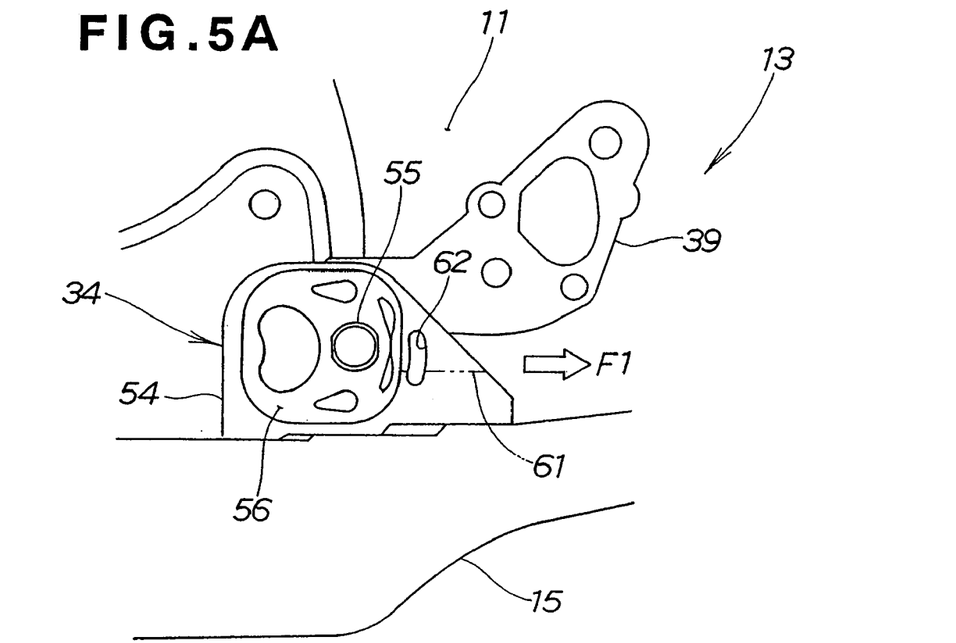
FIG. 5A shows the engine mount undergoing a force produced when the vehicle is in normal operation and FIG. 5B shows the engine mount undergoing a force produced by collision of the vehicle.

With respect to FIG. 5A, for example, when the vehicle accelerates, the transmission upper mount 34 is subjected to a force F1 through the motive power source 13, as shown by an open arrow. In other words, the force F1 acts on the transmission upper mount 34 in a direction from a front part of the vehicle body to a rear part of the vehicle body.

Upon undergoing the force F1, the elastic member 56 is deformed to displace the inner cylindrical member 55 rearwardly of the vehicle body. This makes it possible to withstand or absorb the force F1.

Figure 5B:
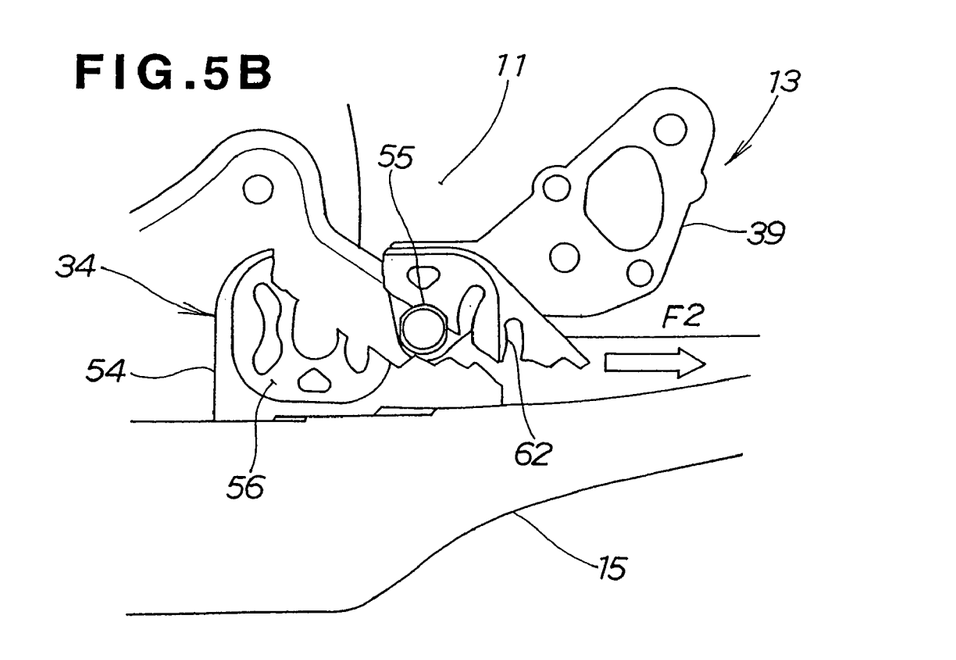

With respect to FIG. 5B, for example, when the vehicle collides with some object, the transmission upper mount 34 is subjected to a force F2 through the motive power source 13, as shown by an open arrow. In other words, the force F2 acts on the transmission upper mount 34 in the direction from the front part of the vehicle body to the rear part of the vehicle body.

Upon exertion of the force F2 on the transmission upper mount 34, the cold shut portion 61 and the weak portion 63 of the resinous bracket 54 are fractured to thereby displace the motive power source 13 rearwardly of the vehicle body, absorbing the collision energy or the collision of the vehicle with the object.

As described with reference to FIG. 1, FIG. 2 and FIG. 4D, the engine 10 and the transmission 11 cooperate with each other to define the motive power source 13. The motive power source 13 is supported by the right and left front side frames and the subframe 12. The left one of the front side frames support the motive power source 13 through the transmission upper mount 34. The transmission upper mount 34 includes the inner cylindrical member 55 mounted to one of the motive power source 13 and the front side frame 15, the resinous bracket 54 mounted to the other, and the elastic member 56 connecting the inner cylindrical member 55 to the resinous bracket 54. The bracket 54 has the cylindrical portion 57 defining the space 58 of cylindrical configuration. The cylindrical portion 57 surrounds the inner cylindrical member 55 with the given interval d provided therebetween. The bracket 54 has the cold shut portion 61 formed when the bracket 54 is molded out of molten resin 74 through the use of the mold 71. The bracket 54 has the weak or fragile portion 63 having the arc-shaped hole 62 formed to extend vertically through the cold shut portion 61. The mold 71 has the cavity 72 formed therein. The mold 71 has the columnar part 76 positioned within the cavity 72 and arranged to provide the cylindrical portion 57 during the molding of the bracket 54. More specifically, during the molding of the bracket 54, the columnar part 76 serves to divide the molten resin 74 into the two parts 74a, 74b. The parts 74a, 74b flow within the cavity 72 in such a manner as to surround the columnar part 76 and join together to provide the cold shut portion 61 therebetween.

The hole 62 may be changed in size or disposed in different positions to cooperate with the cold shut portion 61 of smaller strength so as to change the fracture strength of the bracket 54 of the transmission upper mount 34.

The motive power source 13 is subjected to vibration produced when the vehicle is in normal operation, for example, when it accelerates, decelerates, skids, or travels over a bad road. Production of such vibration exerts a force (normal force) on the transmission upper mount 34. The elastic member 56 of the transmission upper mount 34 is then deformed to absorb the vibration without breaking the resinous bracket 54.

During head-on or offset collision of the vehicle with another vehicle and the like, the transmission upper mount 34 is subjected to a force (collision force) through the motive power source 13. The resinous bracket 54 is then broken to absorb the collision.

Thus, the transmission upper mount 34 is designed to perform a proper operation in response to both the normal operation and collision of the vehicle.

The hole 62 need not extend vertically through the cold shut portion 61 as explained above. Instead of the hole 62, any cutout, slit, recess or groove may be formed on the cold shut portion 61 without extending vertically through the latter.

As discussed above, an engine mount of the present invention includes a bracket having a cold shut portion and a fragile portion provided at the cold shut portion. The cold shut portion and the fragile portion cooperate with each other to provide such a small strength that the engine mount is fractured to allow the rearward displacement of an engine during collision of a vehicle with some object to thereby absorb the collision. The thus arranged engine mount is useful particularly in a technique for absorbing the collision of a vehicle.

What is claimed is:

1. An engine mount for mounting to a vehicle body a motive power source including an engine and a transmission, comprising:

an inner cylindrical member to be mounted to one of said motive power source and said vehicle body;

an outer mounting member to be mounted to the other of said motive power source and said vehicle body, said outer mounting member being elastically connected to said inner cylindrical member; and said outer mounting member having a cylindrical portion loosely receiving said inner cylindrical member therein such that said inner cylindrical member is movable in both axial and radial directions thereof relative to said cylindrical portion, said outer mounting member having a weak portion for fracturing said outer mounting member to displace said motive power source rearwardly of said vehicle body during collision of said vehicle body, said weak portion being provided at a cold shut portion, formed when said outer mounting member is molded from molten resin, of said outer mounting member.

2. An engine mount according to claim 1, wherein the molding of said outer mounting member is performed through the use of a mold having a cavity formed therein and a columnar part disposed within said cavity to provide said cylindrical portion during the molding of said outer mounting member, said columnar part being capable of dividing said molten resin into two parts during the molding of said outer mounting member, such that the two parts of said molten resin flow within said cavity to surround said columnar part and join together to provide said cold shut portion.

3. An engine mount for mounting to a vehicle body a motive power source including an engine and a transmission, comprising:

an inner cylindrical member to be mounted to one of said motive power source and said vehicle body;

a resinous outer mounting member to be mounted to the other of said motive power source and said vehicle body;

an elastic member connecting said inner cylindrical member to said outer mounting member;

said outer mounting member having a cylindrical portion surrounding said inner cylindrical member with a predetermined interval provided therebetween; and said outer mounting member having a cold shut portion and a weak portion provided at said cold shut portion, said cold shut portion being formed when said outer mounting member is molded from molten resin through the use of a mold having a cavity formed therein and a columnar part disposed within said cavity to provide said cylindrical portion during the molding of said outer mounting member, said columnar part being capable of dividing said molten resin into two parts during the molding of said outer mounting member, such that the two parts of said molten resin flow within said cavity to surround said columnar part and join together to provide said cold shut portion.

* * * * *